United States Patent
Yoshida (10) Patent No.: US 10,963,739 B2
(45) Date of Patent: Mar. 30, 2021

(54) LEARNING DEVICE, LEARNING METHOD, AND LEARNING PROGRAM

(71) Applicant: NEC Corporation, Tokyo (JP)

(72) Inventor: Shinichiro Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 63 days.

(21) Appl. No.: 16/490,939

(22) PCT Filed: Jan. 26, 2018

(86) PCT No.: PCT/JP2018/002552
§ 371 (c)(1),
(2) Date: Sep. 4, 2019

(87) PCT Pub. No.: WO2018/173478
PCT Pub. Date: Sep. 27, 2018

(65) Prior Publication Data
US 2020/0019820 A1    Jan. 16, 2020

(30) Foreign Application Priority Data
Mar. 23, 2017 (JP) ............................. JP2017-057901

(51) Int. Cl.
*G06K 9/00* (2006.01)
*G06K 9/62* (2006.01)

(52) U.S. Cl.
CPC .......... *G06K 9/6256* (2013.01); *G06K 9/628* (2013.01); *G06K 9/6254* (2013.01)

(58) Field of Classification Search
CPC ..... G06K 9/6256; G06K 9/6254; G06K 9/628
See application file for complete search history.

(56) References Cited

U.S. PATENT DOCUMENTS

| | | | |
|---|---|---|---|
| 2013/0177232 A1* | 7/2013 | Hirano | G06T 7/0004 382/141 |
| 2016/0026900 A1* | 1/2016 | Ando | G06K 9/4642 382/159 |

(Continued)

FOREIGN PATENT DOCUMENTS

| | | |
|---|---|---|
| JP | 2009-103648 A | 5/2009 |
| JP | 2011-164915 A | 8/2011 |
| JP | 2013-125322 A | 6/2013 |

(Continued)

OTHER PUBLICATIONS

International Search Report for PCT Application No. PCT/JP2018/002552, dated Apr. 17, 2018.

*Primary Examiner* — Ping Y Hsieh (57) ABSTRACT

An intermediate image generating unit 81 generates a plurality of intermediate images from a good product image representing a good product and a faulty product image representing a faulty product. An intermediate image display unit 82 arranges the plurality of intermediate images between the good product image and the faulty product image and displays the same on a display device. A boundary acceptance unit 83 accepts, as a boundary between the good product image and the faulty product image, a designation by a user of a boundary between the intermediate images. A teaching image identification unit 84 identifies the images of the good product image and the faulty product image on the basis of the designated boundary.

10 Claims, 5 Drawing Sheets

(56) References Cited

U.S. PATENT DOCUMENTS

2017/0249766 A1* 8/2017 Namiki ................ G06K 9/6255
2019/0251471 A1* 8/2019 Morita ................. G06F 16/583

FOREIGN PATENT DOCUMENTS

| JP | 2013125322 A | * | 6/2013 |
| WO | 2014/174932 A1 | | 10/2014 |
| WO | WO2014/174932 A1 | * | 10/2014 |

* cited by examiner

FIG. 3

MODEL DATA DB

| NAME | USED IN LEARNING |
|---|---|
| model1 | Img_ok_1.png |
|  | Img_ok_2.png |
|  | Img_ok_3.png |
|  | Img_ng_1.png |
|  | Img_ng_2.png |
|  | Img_ng_3.png |
| ... |  |

LEARNING DEVICE, LEARNING METHOD, AND LEARNING PROGRAM

This application is a National Stage Entry of PCT/JP2018/002552 filed on Jan. 26, 2018, which claims priority from Japanese Patent Application 2017-057901 filed on Mar. 23, 2017, the contents of all of which are incorporated herein by reference, in their entirety.

TECHNICAL FIELD

The present invention relates to a learning device, a learning method, and a learning program for acquiring teaching images for use in learning.

BACKGROUND ART

With the development of image recognition techniques using deep learning, artificial intelligence (AI) is starting to be used as a solution to automate test and inspection tasks by recognizing good products or faulty products by using the image recognition techniques.

For example, Patent Literature (PTL) 1 describes a test result confirmation system that simplifies the confirmation work of determining whether or not the fault determination is correct. The system described in PTL 1 arranges a list of images of respective components in descending order of the level of fault and accepts an operation of designating a boundary location between good and faulty for the list of images. With this operation, the components corresponding to the images located upper than the designated position are determined to be really faulty.

Furthermore, PTL 2 describes an authentication device that authenticates a user who uses an application. The authentication device described in PTL 2 generates an interpolated image by using two image data pieces and changes a correct image from one image data piece to the other image data piece by using the generated interpolated image. In the case of a high value of similarity between one image data piece and the other image data piece, the change in the correct image is minor.

CITATION LIST

Patent Literatures

PTL 1: Japanese Patent Application Laid-Open No. 2009-103648
PTL 2: Japanese Patent Application Laid-Open No. 2011-164915

SUMMARY OF INVENTION

Technical Problem

The machine learning techniques typified by deep learning require collection of sufficient amount of data for teaching a machine to learn. Particularly test and inspection tasks of discriminating between good and faulty products require collection of a large number of good and faulty products.

The test and inspection tasks, however, require classification of similar images or images difficult to be classified by an ordinary person, in such a case where the boundary between good and faulty products is ambiguous, unlike general image classification tasks. Therefore, it is uncertain what kind of or how many teaching data sets need to be added. Moreover, there is also a problem that false positive (detection error) easily occurs during operation only with existing data.

For example, classification between cat and dog will be considered as an example of a general image classification task. Since these two are discriminable at a glance, the classification between cat and dog is easily performed.

On the other hand, classification by the degree of scratch will be considered as an example of the test and inspection tasks. It is assumed that a model is learned with an image of a product having no scratch as a teaching image of a good product and with an image of a product having a scratch measuring 10 cm long as a teaching image of a faulty product.

In the case of an input of an image of a product having no scratch, the product is determined to be a good product on the basis of the learned model. Additionally, in the case of an input of an image of a product having a scratch measuring 9 cm long, the product is likely to be determined to be a faulty product on the basis of the learned model. On the other hand, in the case of an input of an image of a product having a scratch measuring 3 cm long, it is difficult to determine the product. Generally, in the case of learning that a product having no scratch is a good product, the product having the scratch measuring 3 cm long may be determined to be a faulty product.

In the case, however, where a product having a scratch measuring 3 cm long or so is determined to be a good product on the basis of a customer's actual reference, the determination of the above model is erroneous and vice versa. In addition, a large number of appropriate teaching images for the above determination are rarely present.

For example, it is possible to facilitate the determination of the boundary between good and faulty products by using the system described in PTL 1. The images displayed by the system described in PTL 1, however, are actually-collected data and it cannot be stated with certainty that the determination of the boundary contains appropriate images.

Furthermore, the authentication device described in PTL 2 is for use in changing correct images and therefore it is difficult to use the authentication device for determining between good and faulty products.

Therefore, an object of the present invention is to provide a learning device, a learning method, and a learning program enabling accurate learning of a model for discriminating between good and faulty products.

Solution to Problem

A learning device according to the present invention includes: an intermediate image generating unit that generates a plurality of intermediate images from a good product image representing a good product and a faulty product image representing a faulty product; an intermediate image display unit that arranges the plurality of intermediate images between the good product image and the faulty product image and displays the same on a display device; a boundary acceptance unit that accepts, as a boundary between the good product image and the faulty product image, a designation by a user of a boundary between the intermediate images; and a teaching image identification unit that identifies the images of the good product image and the faulty product image on the basis of the designated boundary.

A learning method according to the present invention includes the steps of: generating a plurality of intermediate images from a good product image representing a good product and a faulty product image representing a faulty product; arranging the plurality of intermediate images between the good product image and the faulty product image and displaying the same on a display device; accepting, as a boundary between the good product image and the faulty product image, a designation by a user of a boundary between the intermediate images; and identifying the images of the good product image and the faulty product image on the basis of the designated boundary.

A learning program according to the present invention causes a computer to perform: an intermediate image generating process of generating a plurality of intermediate images from a good product image representing a good product and a faulty product image representing a faulty product; an intermediate image display process of arranging the plurality of intermediate images between the good product image and the faulty product image and displaying the same on a display device; a boundary acceptance process of accepting, as a boundary between the good product image and the faulty product image, a designation by a user of a boundary between the intermediate images; and a teaching image identification process of identifying the images of the good product image and the faulty product image on the basis of the designated boundary.

Advantageous Effects of Invention

The present invention enables accurate learning of a model for discriminating between good and faulty products.

DESCRIPTION OF EMBODIMENT

Hereinafter, an exemplary embodiment of the present invention will be described with reference to accompanying drawings. In the following description, an image representing a good product is referred to as "good product image" and an image representing a faulty product is referred to as "faulty product image." In addition, a model used in this exemplary embodiment is generated by, for example, deep learning.

Figure 1:
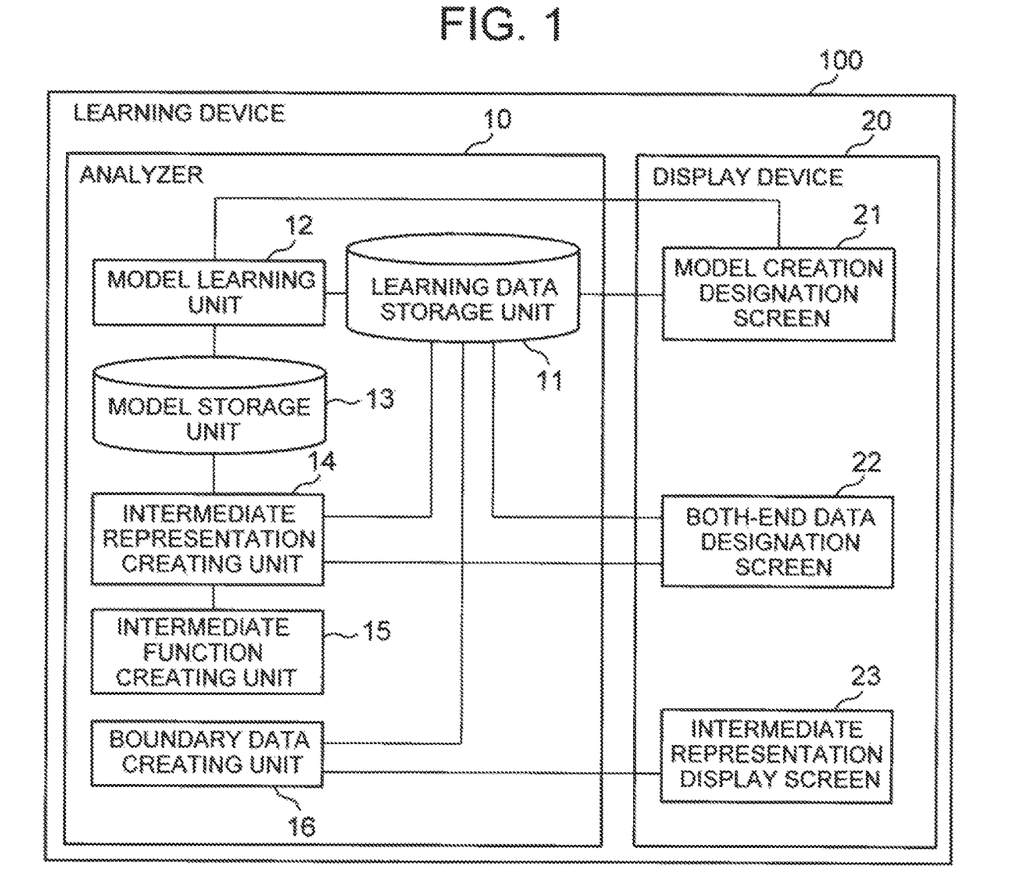
FIG. 1 is a block diagram illustrating an exemplary embodiment of a learning device according to the present invention.

FIG. 1 is a block diagram illustrating an exemplary embodiment of a learning device according to the present invention. A learning device 100 according to this exemplary embodiment includes an analyzer 10 and a display device 20.

The analyzer 10 includes a learning data storage unit 11, a model learning unit 12, a model storage unit 13, an intermediate representation creating unit 14, an intermediate function creating unit 15, and a boundary data creating unit 16.

Figure 2:
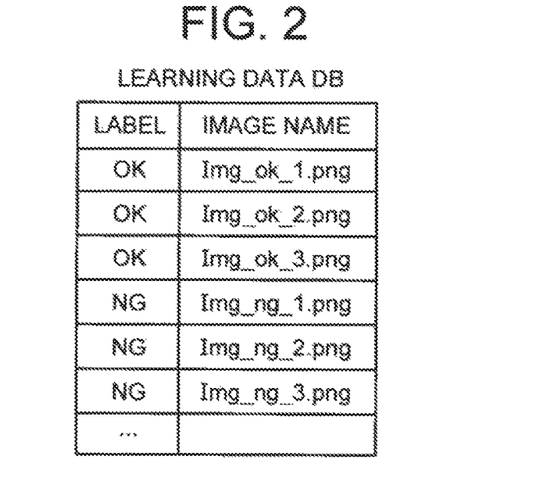
FIG. 2 is an explanatory diagram illustrating an example of data stored in a learning data storage unit.

The learning data storage unit 11 stores data used for learning a model generated by deep learning. FIG. 2 is an explanatory diagram illustrating an example of data stored in the learning data storage unit 11. The example illustrated in FIG. 2 demonstrates that the learning data storage unit 11 stores data in which a label "OK" is set to an image name representing a good product and a label "NG" is set to an image name representing a faulty product.

The model learning unit 12 learns a model from the good product images and faulty product images stored in the learning data storage unit 11.

Figure 3:
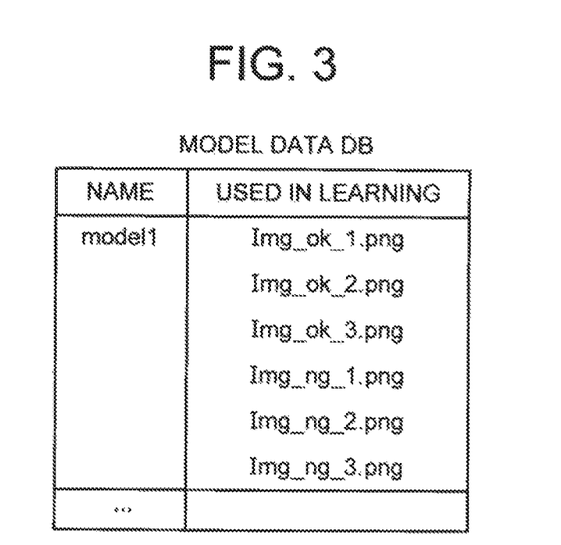
FIG. 3 is an explanatory diagram illustrating an example of information stored in a model storage unit.

The model storage unit 13 stores information on the model. FIG. 3 is an explanatory diagram illustrating an example of information stored in the model storage unit 13. The example illustrated in FIG. 3 demonstrates that the model storage unit 13 stores the name of the model and the images used in learning the model associated with each other. The model storage unit 13 may store information on the model itself as another example. The model storage unit 13 stores a model learned by the model learning unit 12.

The intermediate function creating unit 15 creates an intermediate function used when the intermediate representation creating unit 14 described later generates intermediate images. Intuitively speaking, the intermediate images means the images in the middle of sequential change from an image likely to be determined to represent a good product (unlikely to be determined to represent a faulty product) to an image unlikely to be determined to represent a good product (likely to be determined to represent a faulty product). Specifically, the intermediate function creating unit 15 creates an intermediate function enabling a designation of a level by a parameter by using an intermediate representation for deep learning. This level is an index representing a degree of a good product image or a faulty product image. In the following description, the intermediate image may be referred to as "intermediate representation" in some cases.

Figure 4:
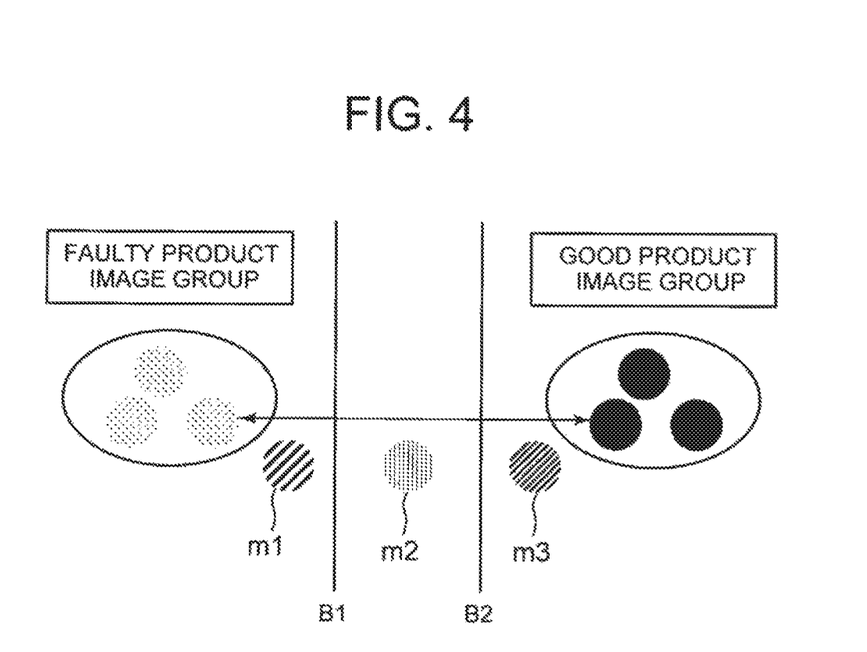
FIG. 4 is an explanatory diagram illustrating an example of a relationship between good product images, faulty product images, and intermediate images.

FIG. 4 is an explanatory diagram illustrating an example of a relationship between good product images, faulty product images, and intermediate images. For example, in the case where a discriminant model has been generated in a generally-known method, it is assumed that the model discriminates between good and faulty products at a boundary B1. On the other hand, it is assumed that a boundary B2 is required to be used as the boundary during an actual operation. In this exemplary embodiment, a plurality of these intermediate images are created and displayed to prompt a user to designate the boundary between good and faulty products out of the intermediate images m1 to m3.

In this exemplary embodiment, description will be made on an example of an intermediate function, which is applied to a case where a user selects one good product image and one faulty product image. If, however, the intermediate representation creating unit 14 described later is able to generate an intermediate image, the content of the intermediate function is arbitrary.

An intermediate representation vector v1, which corresponds to a good product image, and an intermediate representation vector v2, which corresponds to a faulty product image, are assumed. In this condition, the intermediate function creating unit 15 generates an intermediate representation v of an image to be generated as expressed by the following expression 1. In the expression 1, a parameter t is a real number ranging from 0 to 1.

$$v=v1+(v2-v1)*t \qquad \text{(Expression 1)}$$

The intermediate representation creating unit 14, first, selects a good product image and a faulty product image as references for generating intermediate images. Regarding the selection of the good product image and the faulty product image, arbitrary images may be automatically selected or may be selected according to a user's designation. Furthermore, the intermediate representation creating unit 14 selects a target model for generating intermediate images. The intermediate representation creating unit 14 may identify a model selected by the user.

Figure 5:
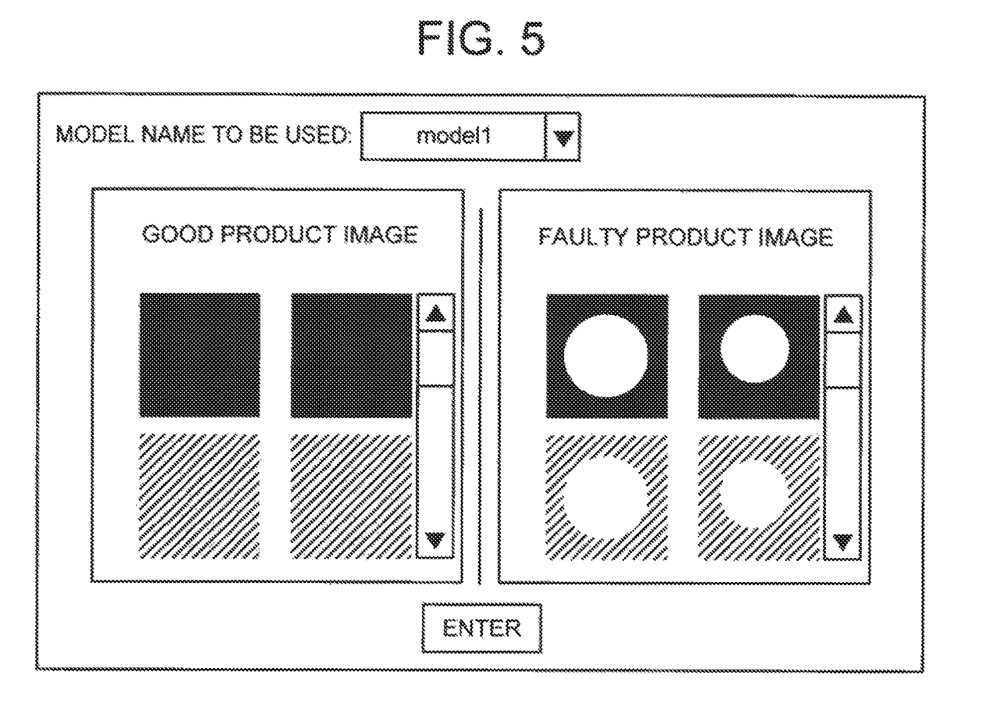
FIG. 5 is an explanatory diagram illustrating an example of a screen for accepting selections of good product images, faulty product images, and a model.

FIG. 5 is an explanatory diagram illustrating an example of a screen for accepting selections of the good product image, the faulty product image, and the model. The screen illustrated in FIG. 5 is used to prompt selection of a model name to be used and selection of one good product image and one faulty product image out of respective data lists. The intermediate representation creating unit 14 may display the screen illustrated in FIG. 5, as a model creation designation screen 21, on the display device 20. Thereby, one good product image, one faulty product image, and one model are selected.

The intermediate representation creating unit 14 generates a plurality of intermediate images from the good product image and the faulty product image. Specifically, the intermediate representation creating unit 14 generates intermediate images for each of which the degree of a good product image or a faulty product image is designated by a parameter on the basis of an intermediate function (intermediate representation) created by the intermediate function creating unit 15.

Furthermore, the intermediate representation creating unit 14 displays the generated intermediate images on the display device 20. Specifically, the intermediate representation creating unit 14 displays a screen (an intermediate representation display screen 23), on which intermediate images are arranged between the good product image and the faulty product image, on the display device 20.

Furthermore, the intermediate representation creating unit 14 displays a screen interface (a both-end data designation screen 22) by which the user is able to designate the boundary between a good product image and a faulty product image in the intermediate images, along with the good product image, the faulty product image, and the intermediate images, on the display device 20. The intermediate representation creating unit 14 identifies the good product image and the faulty product image on the basis of the boundary designated via the screen interface. The method of prompting the user to designate the boundary is arbitrary.

Figure 6:
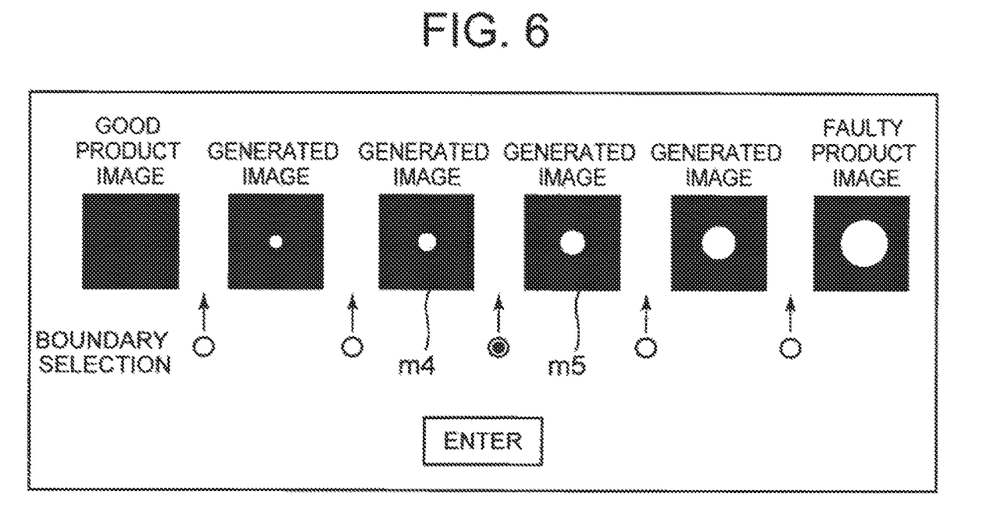
FIG. 6 is an explanatory diagram illustrating an example of a screen for prompting a designation of a boundary for intermediate images.

The intermediate representation creating unit 14 may display a screen interface, for example, that causes the user to designate a position between intermediate images to identify the good product image and the faulty product image on both sides of the position. FIG. 6 is an explanatory diagram illustrating an example of a screen for prompting a designation of a boundary between intermediate images. The screen illustrated in FIG. 6 includes both of the both-end data designation screen 22 and the intermediate representation display screen 23.

FIG. 6 illustrates an example that the intermediate representation creating unit 14 previously generates a plurality of intermediate images and then arranges intermediate images determined to be good product images more easily in positions closer to the good product image and arranges intermediate images determined to be faulty product images more easily in positions closer to the faulty product image.

In the case of the example illustrated in FIG. 6, the intermediate representation creating unit 14 may identify the intermediate image m4, which is located on the good product image side of the designated boundary, as a new good product image and may identify the intermediate image m5, which is located on the faulty product image side of the designated boundary, as a new faulty product image.

Furthermore, the intermediate representation creating unit 14 may display a screen interface capable of variably designating a parameter of an intermediate image on the display device 20 and may display an intermediate image generated according to the designated parameter, instead of previously displaying a plurality of intermediate images. In addition, the intermediate representation creating unit 14 may use the intermediate image of the designated parameter as a boundary.

Figure 7:
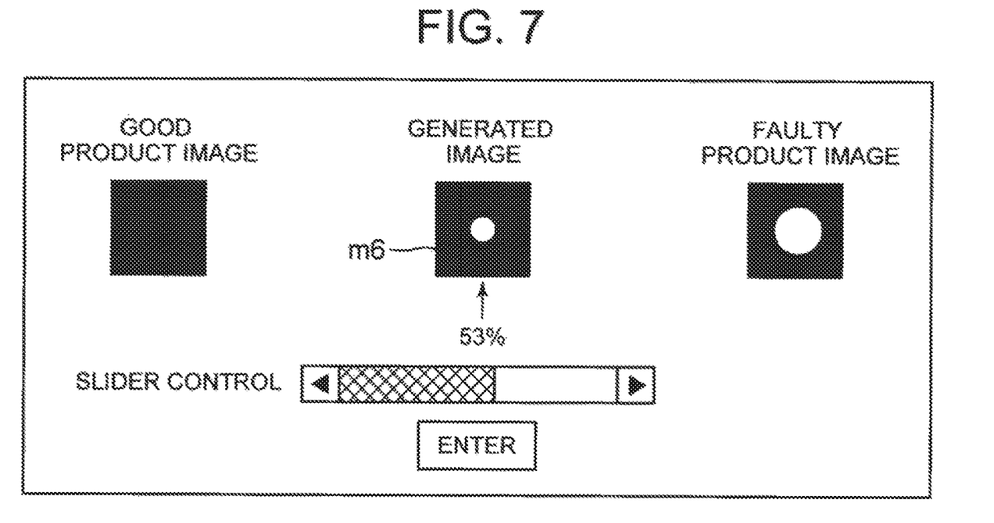
FIG. 7 is an explanatory diagram illustrating another example of a screen for prompting a designation of a boundary for intermediate images.

FIG. 7 is an explanatory diagram illustrating another example of a screen for prompting a designation of a boundary for intermediate images. FIG. 7 illustrates an example that an intermediate image m6 is generated on the basis of a designated parameter t by changing t in the expression 1 illustrated in the above by using a slider (scroll bar) according to a user's operation. Whether or not the intermediate image designated as the boundary is treated as a good product image or a faulty product image should be previously determined.

In the example illustrated in FIG. 7, the intermediate representation creating unit 14 should identify, for example, intermediate images having parameters lower than the designated parameter t of the boundary as new good product images and should identify intermediate images having parameters higher than the designated parameter t of the boundary as new faulty product images. The designation of the parameter is not limited to the designation with a slider, but the value of the parameter may be designated directly.

The boundary data creating unit 16 generates a good product image and a faulty product image on the basis of the identified boundary and registers the same in the learning data storage unit 11. The model learning unit 12 relearns the model, for example, with deep learning by using the good product image and the faulty product image identified from intermediate images.

The model learning unit 12, the intermediate representation creating unit 14, the intermediate function creating unit 15, and the boundary data creating unit 16 are implemented by the CPU of the computer that operates according to a program (learning program). For example, the program may be stored in a memory unit (not illustrated) of the learning device 100 and the CPU may read the program and operate as the model learning unit 12, the intermediate representation creating unit 14, the intermediate function creating unit 15, and the boundary data creating unit 16 according to the program.

Furthermore, the model learning unit 12, the intermediate representation creating unit 14, the intermediate function creating unit 15, and the boundary data creating unit 16 may be implemented by dedicated hardware devices, respectively. In addition, the learning data storage unit 11 and the model storage unit 13 are implemented by, for example, a magnetic disk and the like.

Figure 8:
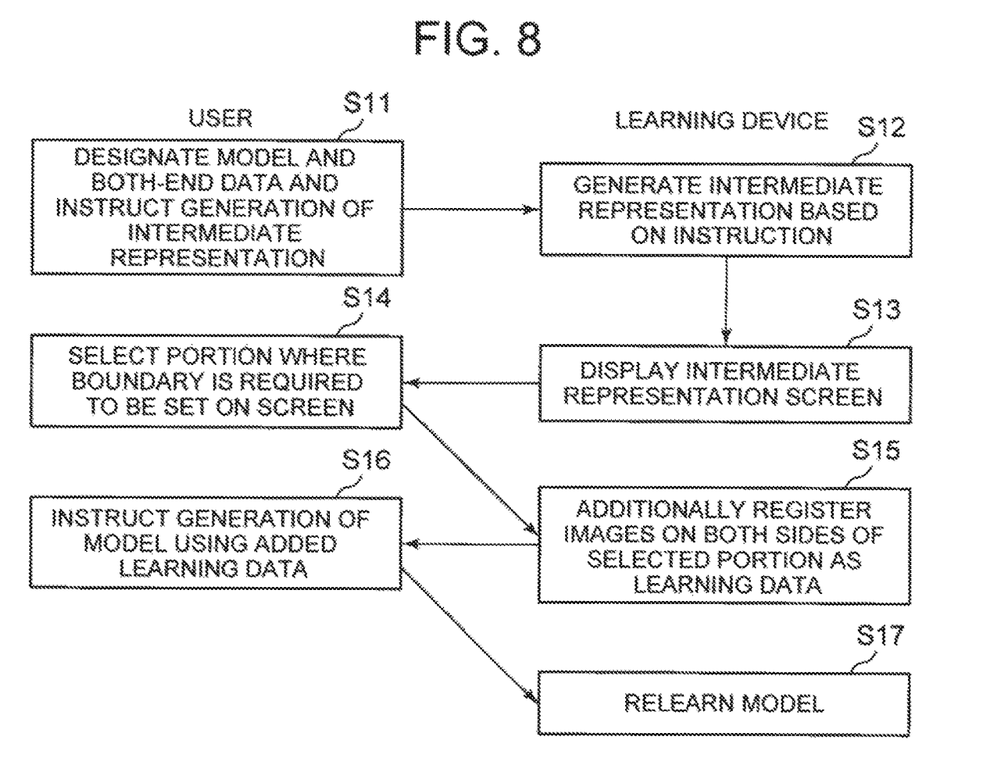
FIG. 8 is a flowchart illustrating an operation example of a learning device.

Subsequently, the operation of the learning device 100 according to the present exemplary embodiment will be described. FIG. 8 is a flowchart illustrating an operation example of the learning device 100 according to the present exemplary embodiment.

First, a user designates a model and both-end data (more specifically, a good product image and a faulty product image) and instructs the learning device 100 to generate an intermediate representation (step S11). The intermediate representation creating unit 14 generates the intermediate representation (more specifically, an intermediate image) on the basis of the designation (step S12) and displays an intermediate representation screen (step S13).

The user selects a portion that the user wants to use as a boundary (step S14) via the intermediate representation screen (step S14). The intermediate representation creating unit 14 identifies the images on both sides of the selected portion as a good product image and a faulty product image and additionally registers the same as learning data (step S15). The user adds the added learning data and instructs the generation of the model (step S16). Thereupon, the model learning unit 12 relearns the model by using the added learning data (step S17).

As described above, the intermediate representation creating unit 14 generates a plurality of intermediate images from the good product image and the faulty product image and then arranges the plurality of intermediate images between the good product image and the faulty product image and displays the same on the display device 20 in this exemplary embodiment. Moreover, upon accepting a designation by a user of an intermediate image boundary as a boundary between the good product image and the faulty product image, the intermediate representation creating unit 14 identifies the images as the good product images and as the faulty product images on the basis of the designated boundary. This enables a model for discriminating between good and faulty products to be accurately learned. In addition, the intermediate representation creating unit 14 according to this exemplary embodiment operates as an intermediate image generating unit, an intermediate image display unit, a boundary acceptance unit, and a teaching image identification unit.

Furthermore, the learning device 100 according to this exemplary embodiment is able to generate an accurate model from existing data without adding new data also for data close to the boundary surface. It is because the learning device 100 is able to create the data close to the boundary surface for learning and to update the boundary surface recognized by the model.

More specifically, in this exemplary embodiment, teaching images are collected for good products and faulty products in a learning step in a case of automating a faulty product detecting operation using image recognition techniques with machine learning typified by deep learning. First, the model learning unit 12 learns a model by deep learning from the teaching images for the good products and for the faulty products which have already been collected.

Thereafter, the intermediate representation creating unit 14 generates a plurality of intermediate images from the learned model or feature value and from the good product image and faulty product image designated by the user. In addition, the intermediate representation creating unit 14 displays a screen for causing the user to designate the recognition boundary surface from the generated intermediate images so as to cause the user to identify the boundary between a good product image and a faulty product image. This enables the teaching images to be padded by using the plurality of intermediate images having been generated, thereby increasing the accuracy of the model.

Subsequently, a modification of this exemplary embodiment will be described. In the first exemplary embodiment, description has been made on intermediate representations in the case where a user selects one good product image and one faulty product image. In this modification, description will be made on a situation where a plurality of faulty product images are selected.

As a specific example, it is assumed here that a user selected one good product image and two faulty product images, where v1 is an intermediate representation vector corresponding to the good product image and v2 and v3 are intermediate representation vectors corresponding to faulty product images. In this case, the intermediate function creating unit 15 generates the intermediate representation v of the image to be generated as expressed by the following expression 2. The parameters t1 and t2 in the expression 2 are similar to the parameter t (a real number ranging from 0 to 1) in the above expression 1.

$$v=v1+(v2-v1)*t1+(v3-v1)*t2 \quad \text{(Expression 2)}$$

According to the combination of selected faulty product images, the intermediate images of a variation corresponding to the respective faulty product images are generated. For example, there are cases where an image different in color from the good product image is selected as the first faulty product image and an image different in shape from the good product image is selected as the second faulty product image.

The expression 2 illustrated in the above represents a plane space starting at v1 with (v2−v1) and (v3−v1) as direction vectors. Accordingly, the intermediate images are generated with a two-dimensional expansion.

Figure 9:
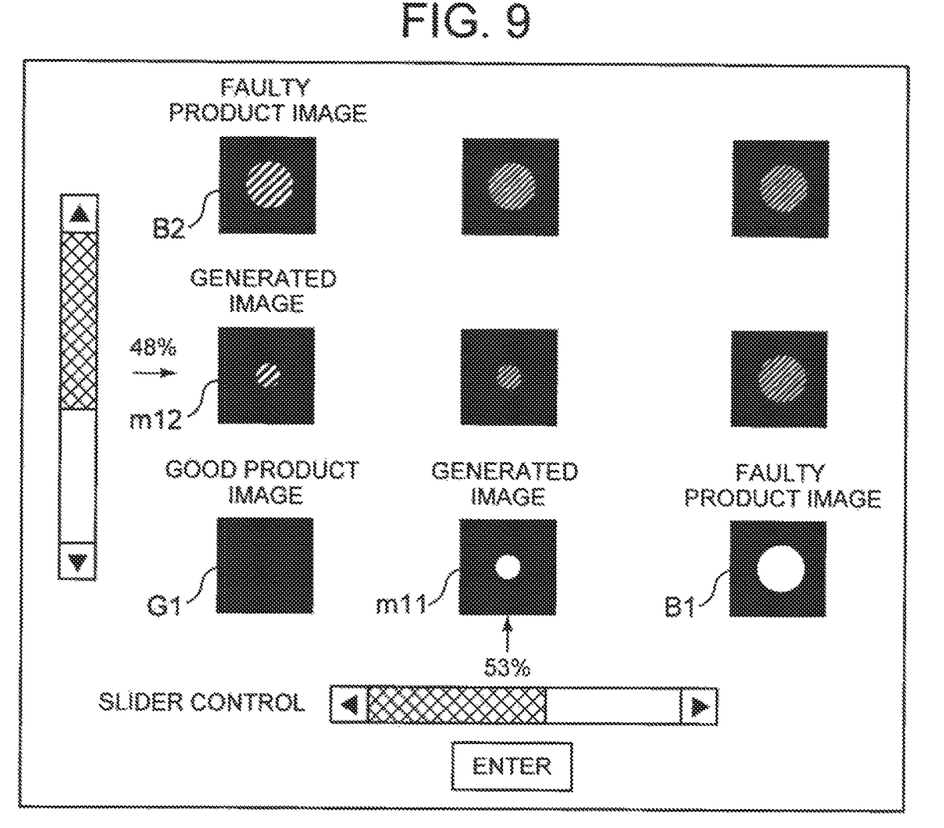
FIG. 9 is an explanatory diagram illustrating an example of a screen for prompting a designation of a boundary with two-dimensionally displayed intermediate images.

FIG. 9 is an explanatory diagram illustrating an example of a screen for prompting a designation of a boundary with two-dimensionally displayed intermediate images. In the example illustrated in FIG. 9, the intermediate representation creating unit 14 generates a plurality of intermediate images from a good product image G1 and two faulty product images (hereinafter, referred to as the first faulty product image B1 and the second faulty product image B2). Specifically, the intermediate representation creating unit 14 displays the images on the display device 20 with the good product image G1 as a point of origin and with the first faulty product image B1 and the second faulty product image B2 arranged in two axial directions different from each other (specifically, to the right and upward).

Furthermore, in the example illustrated in FIG. 9, similarly to the example illustrated in FIG. 7, the intermediate representation creating unit 14 generates intermediate images m11 and m12 on the basis of the designated parameters t1 and t2 by varying t1 and t2 in the expression 2 illustrated in the above by using a slider according to a user's operation. This designation of the parameters corresponds to the designation of the boundary between the good product image G1 and the first faulty product image B1 and the boundary between the good product image G1 and the second faulty product image B2.

As illustrated in FIG. 7, the intermediate representation creating unit 14 may display a screen interface for prompting the designation of the position between intermediate images and then prompting the identification of images on both sides of the position as a good product image and a faulty product image.

In this modification, one good product image and two faulty product images have been selected to describe a method of generating intermediate images having a two-dimensional expansion. Similarly, it is also possible to expand faulty product images to be designated to n-dimension. Since the user is caused to designate the boundary, the number of dimensions is preferably at most three dimensions or so.

Figure 10:
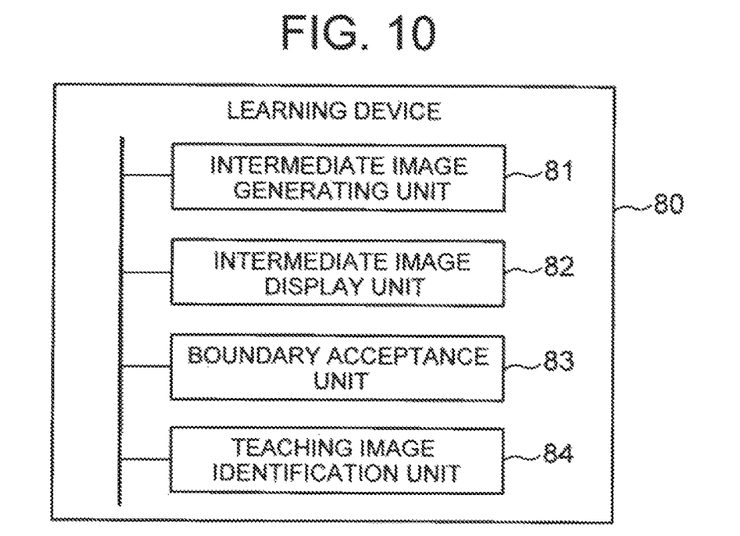
FIG. 10 is a block diagram illustrating an outline of a learning device according to the present invention.

Subsequently, description will be made on the outline of the present invention. FIG. 10 is a block diagram illustrating an outline of a learning device according to the present invention. A learning device 80 (for example, the learning device 100) according to the present invention includes: an intermediate image generating unit 81 (for example, the intermediate representation creating unit 14) that generates a plurality of intermediate images from a good product image representing a good product and a faulty product image representing a faulty product; an intermediate image display unit 82 (for example, the intermediate representation creating unit 14) that arranges a plurality of intermediate images between the good product image and the faulty product image and displays the same on a display device (for example, the display device 20); a boundary acceptance unit 83 (for example, the intermediate representation creating unit 14) that accepts, as a boundary between the good product image and the faulty product image, a designation by a user of an intermediate image boundary; and a teaching image identification unit 84 (for example, the intermediate representation creating unit 14) that identifies the good product image and the faulty product image on the basis of the designated boundary.

The above configuration enables a model for discriminating between good and faulty products to be accurately learned.

Furthermore, the intermediate image generating unit 81 may generate intermediate images in which the degrees of good product images or faulty product images are designated by parameters.

Moreover, the boundary acceptance unit 83 may accept a designation by a user of a position between displayed intermediate images and the teaching image identification unit 84 may identify the images on both sides of the designated position as a good product image and a faulty product image.

Additionally, the boundary acceptance unit 83 may accept the designation by the user of an intermediate image parameter and the teaching image identification unit 84 may identify the good product image and the faulty product image with the intermediate image generated by the designated parameter as a boundary.

Moreover, the intermediate image generating unit 81 may generate a plurality of intermediate images from a good product image, a first faulty product image, and a second faulty product image, the intermediate image display unit 82 may arrange the first faulty product image and the second faulty product image in two axial directions different from each other, with the good product image as a point of origin, and displays the same on the display device, the boundary acceptance unit 83 may accept a designation by a user of a boundary between the good product image and the first faulty product image and of a boundary between the good product image and the second faulty product image, and the teaching image identification unit 84 may identify the good product image and the faulty product images on the basis of the designated boundaries.

Furthermore, the learning device 80 may include a learning unit (for example, the model learning unit 12) that relearns the model by using a good product image and a faulty product image identified from intermediate images.

INDUSTRIAL APPLICABILITY

The present invention is suitably applied to a learning device that acquires a teaching image for use in learning. Furthermore, the present invention is suitably applied to an AI that automates test and inspection tasks by recognizing good products and faulty products with the development of image recognition techniques by deep learning.

Although the present invention has been described with reference to the exemplary embodiments and examples hereinabove, the present invention is not limited thereto. A variety of changes, which can be understood by those skilled in the art, may be made in the configuration and details of the present invention within the scope thereof.

This application claims priority to Japanese Patent Application No. 2017-057901 filed on Mar. 23, 2017, and the entire disclosure thereof is hereby incorporated herein by reference.

REFERENCE SIGNS LIST 10 analyzer
11 learning data storage unit
12 model learning unit
13 model storage unit
14 intermediate representation creating unit
15 intermediate function creating unit
16 boundary data creating unit
21 model creation designation screen
22 both-end data designation screen
23 intermediate representation display screen
20 display device
100 learning device

What is claimed is:

1. A learning device comprising:
at least one memory configured to store instructions; and
at least one processor configured to execute the instructions, to perform:
generating a plurality of intermediate images from a good product image representing a good product and a faulty product image representing a faulty product;
arranging the plurality of intermediate images between the good product image and the faulty product image and displays the same on a display device;
accepting, as a boundary between the good product image and the faulty product image, a designation by a user of a boundary between the intermediate images; and
identifying the images of the good product image and the faulty product image on the basis of the designated boundary.

2. The learning device according to claim 1, the instructions further comprising:
generating intermediate images in which the degrees of good product images or faulty product images are designated by parameters.

3. The learning device according to claim 1, the instructions further comprising:
accepting the designation by the user of the position between the displayed intermediate images; and identifying images on both sides of the designated position as a good product image and a faulty product image.

4. The learning device according to claim 1, the instructions further comprising:
   accepting the designation by the user of an intermediate image parameter; and
   identifying the good product image and the faulty product image with the intermediate image generated by the designated parameter as a boundary.

5. The learning device according to claim 1, the instructions further comprising:
   generating a plurality of intermediate images from a good product image, a first faulty product image, and a second faulty product image;
   arranging the first faulty product image and the second faulty product image in two axial directions different from each other, with the good product image as a point of origin, and displays the same on the display device;
   accepting a designation by the user of a boundary between the good product image and the first faulty product image and of a boundary between the good product image and the second faulty product image; and
   identifying the images of the good product image and the faulty product images on the basis of the designated boundaries.

6. The learning device according to claim 1, the instructions further comprising:
   relearning a model by using the good product image and faulty product image identified from the intermediate images.

7. A learning method comprising:
   generating a plurality of intermediate images from a good product image representing a good product and a faulty product image representing a faulty product;
   arranging the plurality of intermediate images between the good product image and the faulty product image and displaying the same on a display device;
   accepting, as a boundary between the good product image and the faulty product image, a designation by a user of a boundary between the intermediate images; and
   identifying the images of the good product image and the faulty product image on the basis of the designated boundary.

8. The learning method according to claim 7, comprising generating intermediate images in which the degrees of good product images or faulty product images are designated by parameters.

9. A non-transitory computer readable information recording medium configured to store a learning program: when executed by a processor, that performs a method for:
   generating a plurality of intermediate images from a good product image representing a good product and a faulty product image representing a faulty product;
   an intermediate image display process of arranging the plurality of intermediate images between the good product image and the faulty product image and displaying the same on a display device;
   accepting, as a boundary between the good product image and the faulty product image, a designation by a user of a boundary between the intermediate images; and
   a teaching image identification process of identifying the images of the good product image and the faulty product image on the basis of the designated boundary.

10. The non-transitory computer readable information recording medium according to claim 9, further comprising: generating intermediate images in which the degrees of good product images or faulty product images are designated by parameters.

* * * * *